United States Patent [19]
Otsuboj

[11] 3,779,637
[45] Dec. 18, 1973

[54] SLIDE ATTACHMENT WITH A SOUNDING MECHANISM

[76] Inventor: Minoru Otsuboj, 11-21, 1-chome, Nakacho, Meguro-ku, Tokyo, Japan

[22] Filed: Mar. 7, 1972

[21] Appl. No.: 232,469

Related U.S. Application Data

[63] Continuation-in-part of Ser. No. 45,391, April 11, 1970, abandoned.

[30] Foreign Application Priority Data
June 14, 1969  Japan................................ 44/46500

[52] U.S. Cl.................... 353/120, 274/11 R, 353/19
[51] Int. Cl............................................. G03b 31/06
[58] Field of Search........................... 353/19, 120; 274/11 R, 12, 43

[56] References Cited
UNITED STATES PATENTS

| | | | |
|---|---|---|---|
| 3,176,580 | 4/1965 | Metz | 353/19 |
| 3,563,644 | 2/1971 | Castedello | 353/19 |
| 2,338,414 | 1/1944 | DeSant | 274/11 R |
| 3,666,275 | 5/1972 | Heine | 274/11 R |
| 3,296,925 | 1/1967 | Yamamoto | 353/19 |

Primary Examiner—Louis R. Prince
Assistant Examiner—A. J. Mirabito
Attorney—Norman F. Oblon et al.

[57] ABSTRACT

A slide attachment with a sound mechanism which includes a photographic slide film secured within an opening of a casing and an endless strip of film on which sound is recorded in a helical groove with the endless strip being mounted for sliding movement within the casing circumferentially about the opening.

6 Claims, 3 Drawing Figures

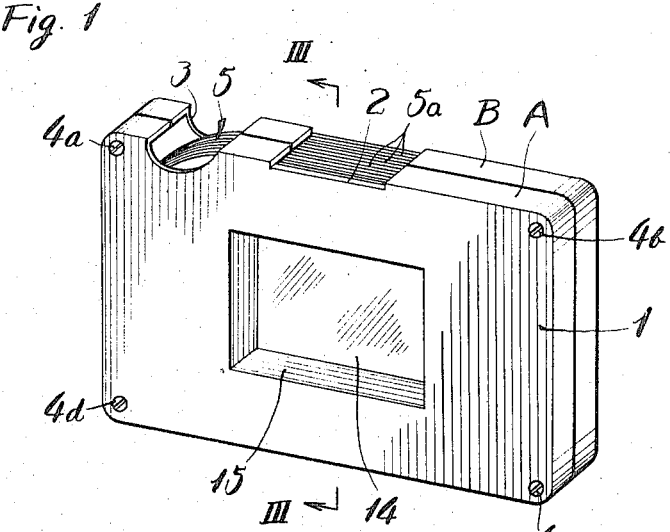
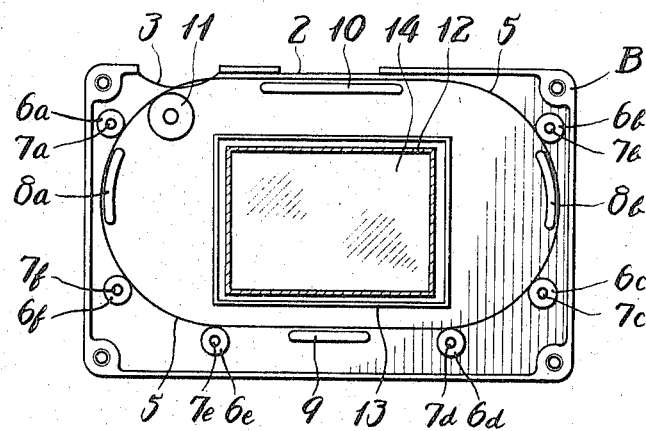
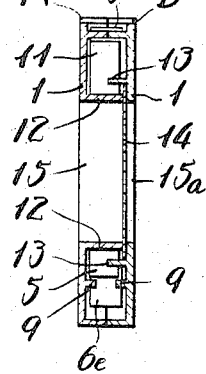

SLIDE ATTACHMENT WITH A SOUNDING MECHANISM

This application is a Continuation-In-Part of copending application Ser. No. 45,391, filed June 11, 1970 now abandoned, for: "A SLIDE ATTACHMENT WITH A SOUNDING MECHANISM."

BACKGROUND OF THE INVENTION

This invention relates to a photographic slide attachment with an accompanying sound recording, and more particularly to an improved slide attachment adapted to be used in an automatic slide indexing projector and integrally provided with a mechanism for recording sound associated with the photographic portion of the slide.

Slide attachments with integral sound recordings have been utilized in the past and have generally included a separate audio portion for each frame of visual presentation as distinguished from a continuous audio portion for a plurality of visual presentations as utilized in motion pictures. The conventional audio-visual slides have included a plurality of respective pictures on a single strip of film, each of which has included a number of parallel strips of optically recorded bands for recording sound within the space between the respective picutres, and a sound reproducing mechanism for scanning the optically recorded sound as the film strip rotates. The sound reproducing mechanism utilized with such conventional audio-visual slides has been necessarily complicated and extremely expensive. A further disadvantage of prior art audio-visual slides has been in the difficulty in changing the order of the multiple frames of the slides in order to add additional frames between the existing pictures or to delete a particular picture from the order of frames of the slide presentation.

More recently, individual photographic slides have been proposed wherein an individual audio portion is in accompaniment with the slide in the form of a magnetic tape. However, such devices have not been wholly successful in that they require the magnetic tape to be reel to reel or in a serpentine form, each of which is overly cumbersome and complicated. In order to provide sufficient magnetic tape for an adequate presentation for an individual slide, such cartridges or reel to reel devices have necessarily been too large and expensive for home type use.

Although grooved platter type recordings have been suggested for use in a single presentation slide mechanism, such devices have been excessively large, expensive, and have necessitated the use of combined projector-player units of complicated and large design since the audio and visual pickups must be side to side.

SUMMARY OF THE INVENTION

Accordingly, one object of this invention is to provide a new and improved photographic slide with an associated sound recording.

Another object of the invention is the provision of a new and improved slide attachment of economical design with an associated mechanism for recording and reproducing sound corresponding to the photographic slide.

It is another object of this invention to provide a slide attachment with an associated sound mechanism which is simple in operation for reproducing sound.

Still one further object of the present invention is to provide a slide attachment of compact design capable of reproducing sound for coordination with the visual presentation.

Briefly, in accordance with one embodiment of this invention, these and other objects are obtained by providing a slide attachment with an associated sound mechanism including a casing having a reproducing opening provided on one portion thereof and a driving opening provided on a second portion thereof, an endless strip of film having sound recorded in a helical groove thereon and mounted and guided within the casing, and supporting structure within the casing for securing a photographic film slide within the casing.

BRIEF DESCRIPTION OF THE DRAWING

A more complete appreciation of the invention and many of the attendant advantages thereof will be readily appreciated as the same becomes better understood by reference to the following detailed description when considered in connection with the accompanying Drawings, wherein:

FIG. 1 is a perspective view of a slide attachment constructed in accordance with the present invention;

FIG. 2 is a sectional view of the slide attachment taken longitudinally along the central plane thereof and showing the inside portion thereof; and, FIG. 3 is a sectional view of the slide attachment taken along the line III—III of FIG. 1.

DESCRIPTION OF THE PREFERRED EMBODIMENTS

Referring now to the Drawings, wherein like reference characters designate identical or corresponding parts throughout the several views, the slide attachment of the present invention includes a casing 1 having two half-shell portions A and B with a reproducing opening 2 provided on one portion of the outer peripheral edge thereof and a driving opening 3 adjacent thereto. Four screws, 4a, 4b, 4c, and 4d, are mounted at the four corners of the casing 1 for connecting the two half-shell portions A and B. An endless strip film record 5 including a sound recording channel formed on the outer surface thereof in the form of a helical groove 5a is positioned within the casing and is guided by guide rollers 6a, 6b, 6c, 6d, 6e, and 6f. A plurality of shafts 7a, 7b, 7c, 7d, 7e, and 7f are supported within holes formed on both of the inside sirfaces of the two halves A and B for rotatably supporting the guide rollers 6a through 6f, respectively. Arcuate guide banks 8a and 8b, as well as straight guide bank 9 project from the inner surfaces of the casing halves A and B for supporting both sides of the endless film record 5 intermediate the guide rollers. A sound pickup or needle pressure supporting plate 10 projects from both inner surfaces of the casing halves A and B from the opposite side of the sound recording strip 5 to the reproducing opening 2. A follower roller 11 is mounted rotatably on the opposite side of the strip 5 to the driving opening 3.

A film slide supporting frame 12 is provided at the peripheral edge of an opening 15 formed at the central portion of the half A of casing 1 opposite to the peripheral edge of an opening 15a formed in corresponding relationship at the central portion of the casing half B for supporting a photographic film slide 14. A frame portion 13 is provided on casing half B for positioning the photographic film slide 14 as it is held in position by the slide supporting frame 12.

The slide casing 1 is constructed so as to be readily mounted within the projection position and may be formed of opaque synthetic resin material so as to restrict any detrimental light leaking from the projector light source and for guiding the projecting light to the slide film 14 through the openings 15 and 15a.

An external driving source (not shown) such as, for example, a shaft or roller, may be utilized to rotate the film record 5 at a constant speed in cooperation with the follower roller 11. The guide rollers 6a through 6f are so disposed as to deform the circular endless strip film record 5 into a shape corresponding generally to the internal shape of the casing 1 such that the endless film record 5 is supported by the outer surfaces of the respective guide rollers preventing the film record from contacting the inner surface of the casing 1 so as to maintain the smooth low friction rotation of the endless film record 5. The arcuate guide banks 8a and 8b and the straight guide bank 9 projecting from the inner surfaces of the casing halves A and B may be constructed of a predetermined size and shape so as to reduce the friction between the film record 5 and the banks and also to reduce the number of guide rollers so a to provide a more economic design. The pressure support plate 10 is utilized to prevent the film record 5 from being depressed when groove 5a is engaged by a sound pickup device, such, for example, as a needle, so as to reproduce the sound in high-fidelity and also to support the travelling film record 5 while reducing the vibratory motion thereof.

The mechanism for rotatably supporting the endless film record need not be restricted to the particular design as shown in the Drawings and as described above. The film record may be provided with sufficient rigidity so as to automatically reset into the original circular shape from a deformed shape which the film record may be held in by the guide rollers. The film record may be mounted within the casing in many ways, and in many configurations with the guide rollers and guide banks either positioned inwardly of the film record or outwardly thereof.

In operation of the subject invention, when the slide attachment is indexed into the projection position of a slide projector, the film will be rotated by the external driving force through the driving opening 3 and a pickup device, such as, for example, a needle, will be positioned on the recorded channel 5a of the film record to the reproducing opening 2 so as to present the sound portion of the film record together with the photographic portion of the film slide 14 which will, in turn, be projected by a source of light through the opening 15.

Obviously, numerous modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. A slide attachment with a sound recording mechanism comprising:
   a casing including two halves,
   a reproducing opening and a driving opening provided on said casing,
   means for connecting said two halves of said casing,
   endless resilient strip record means disposed within said casing, for recording a sound on a helical grooved channel formed thereon,
   means for guiding said endless resilient strip record means, whereupon engagement of said guiding means with said resilient record means causes said resilient record means to deform and become tensioned so as to facilitate driving of said record means,
   means for supporting said guiding means and said endless resilient strip record means,
   pressure supporting means mounted on said casing,
   follower rolling means rotatably mounted near the driving opening of said casing,
   film slide supporting means provided on said casing, and,
   a film slide supported by said film slide supporting means.

2. A slide attachment as set forth in claim 1, wherein said guiding means are guide rollers.

3. A slide attachment as set forth in claim 1, wherein said first-named supporting means are shafts supported on both inner surfaces of the two halves of said casing.

4. A slide attachment as set forth in claim 1, wherein said casing is formed of opaque synthetic resin.

5. A slide attachment as set forth in claim 1, further comprising guide banks for guiding said strip record.

6. An audio-visual slide attachment comprising:
   a casing having at least first and second openings defined therein, said first opening providing access for a driving member and said second opening providing access for a sound pickup device,
   an endless resilient strip record disposed within said casing, for recording sound on a helical groove channel formed thereon,
   means for guiding said endless resilient strip record into alignment with said first and second openings defined in said casing, whereupon engagement of said guiding means with said resilient record means causes said resilient record means to deform and become tensioned so as to facilitate driving of said record means by said driving member, and
   means for supporting a single photographic film slide within said casing.

* * * * *